United States Patent [19]

Beirle et al.

[11] Patent Number: 5,207,536
[45] Date of Patent: May 4, 1993

[54] PIPE SWITCH WITH EXTERNALLY ARRANGED DRIVE UNIT

[75] Inventors: Walter Beirle; Martin Sindermann; Martin Frank, all of Ravensburg, Fed. Rep. of Germany

[73] Assignee: Wäschle Maschinenfabrik GmbH, Ravensburg, Fed. Rep. of Germany

[21] Appl. No.: 867,974

[22] Filed: Apr. 13, 1992

[30] Foreign Application Priority Data

Apr. 19, 1991 [DE] Fed. Rep. of Germany ... 9104817[U]

[51] Int. Cl.$^5$ .............................................. B65G 53/56
[52] U.S. Cl. ..................................... 406/182; 406/181
[58] Field of Search ............ 406/182, 181; 193/31 R, 193/31 A

[56] References Cited

U.S. PATENT DOCUMENTS

| 2,690,931 | 10/1954 | Baresch | 406/182 |
| 4,264,244 | 4/1981 | Steele | 406/182 |
| 4,449,863 | 5/1984 | Ullner | 406/182 |

FOREIGN PATENT DOCUMENTS 2218762 11/1989 United Kingdom ............... 406/182

Primary Examiner—Russell D. Stormer
Assistant Examiner—James M. Kannofsky
Attorney, Agent, or Firm—Henry M. Feiereisen

[57] ABSTRACT

A pipe switch for pneumatically conveying a material such as bulk material includes a housing provided with a first port, a second port extending coaxially with the first port and a third port having an axis extending at an angle of less than 90° relative to the axis of the second port, with the housing accommodating a cock which extends between opposing side covers and by which the first port is selectively connectable with the second port and with the third port. In order to reduce a danger of accident and to allow easy access to the interior of the pipe switch, the entire drive unit for actuating the cock is connected to the pipe switch at one of the side covers, with all movable parts being housed within an external compartment defined by an outer wall mounted to the one side cover.

11 Claims, 3 Drawing Sheets

PIPE SWITCH WITH EXTERNALLY ARRANGED DRIVE UNIT

BACKGROUND OF THE INVENTION

The present invention refers to a pipe switch or multiport valve for pneumatically conveying bulk material, and in particular to a pipe switch of the type including a housing provided with a first port, a second port extending coaxially with the first port, and a third port having an axis extending at an angle of less than 90° relative to the axis of the second port, with the housing accommodating a cock by which the first port is selectively connectable with the second port and with the third port.

In general, the cock or rotor of such a conventional pipe switch extends between side covers which are provided with coincidental brackets. These brackets project beyond the housing and form a forked attachment for the working cylinder, with its piston rod engaging the bent end of the exposed drive lever. Mounted upon the side covers of the housing are limit switches which are actuated by a cam connected to the lever. With such a pipe switch, the area of compressed air and the drive are sufficiently separated from the switch interior and thus from the product and transport fluid. However, under the aspect of accident prevention and operational safety, the exposed arrangement of movable parts is highly undesirable. Moreover, the arrangement of those parts at the respective side covers complicates a dismantling of the side covers so that a frequently desired cleaning of the pipe switch, which requires a removal of the side covers, becomes difficult.

SUMMARY OF THE INVENTION

It is thus an object of the present invention to provide an improved pipe switch obviating the afore-stated drawbacks.

In particular, it is an object of the present invention to provide an improved pipe switch which is devoid of any exposed movable parts and allows rapid and simple dismantling of the side covers.

These objects and others which will become apparent hereinafter are attained in accordance with the present invention by mounting the entire drive unit at one side cover such that all movable parts of the drive unit are housed within an external compartment mounted to the side cover.

Through the arrangement of the entire drive unit at one side cover, the pipe switch can easily be accessed and cleaned by removing the opposite side cover from the housing. Certainly, it may be possible to allow detachment of the opposite side cover without requirement of a tool. All movable parts are now shielded against contact and contamination through accommodation within the outer coapartment.

According to a further feature of the present invention, the actuation of the cock for movement between the end positions is attained by receiving one journal of the cock in a pivot pin which projects beyond the one side cover into the compartment and is integrally connected with a driver plate which is sandwiched between the one side cover and the facing side surface of the cock and is in force-locking connection with the cock via a pin-groove arrangement. A lever is fixedly secured to the pivot pin at its end arranged within the compartment and acted upon by a cylinder/piston arrangement to move the cock between the end positions. Suitably both side faces of the cock are similarly designed for selectively allowing force-locking connection of the driver plate with the cock. In this manner, the drive unit of the pipe switch can easily be modified by a simple exchange of the respective side covers, without altering the fitting position of the cock. A suitable design of the engagement between the driver plate and the cock allows also a positional change of the working cylinder relative to the ports by shifting about a desired angle the screwed connection of the side cover, which carries the working cylinder, to the housing.

BRIEF DESCRIPTION OF THE DRAWING

The above and other objects, features and advantages of the present invention will now be described in more detail with reference to the accompanying drawing in which.

DETAILED DESCRIPTION OF PREFERRED EMBODIMENTS

Figure 1:
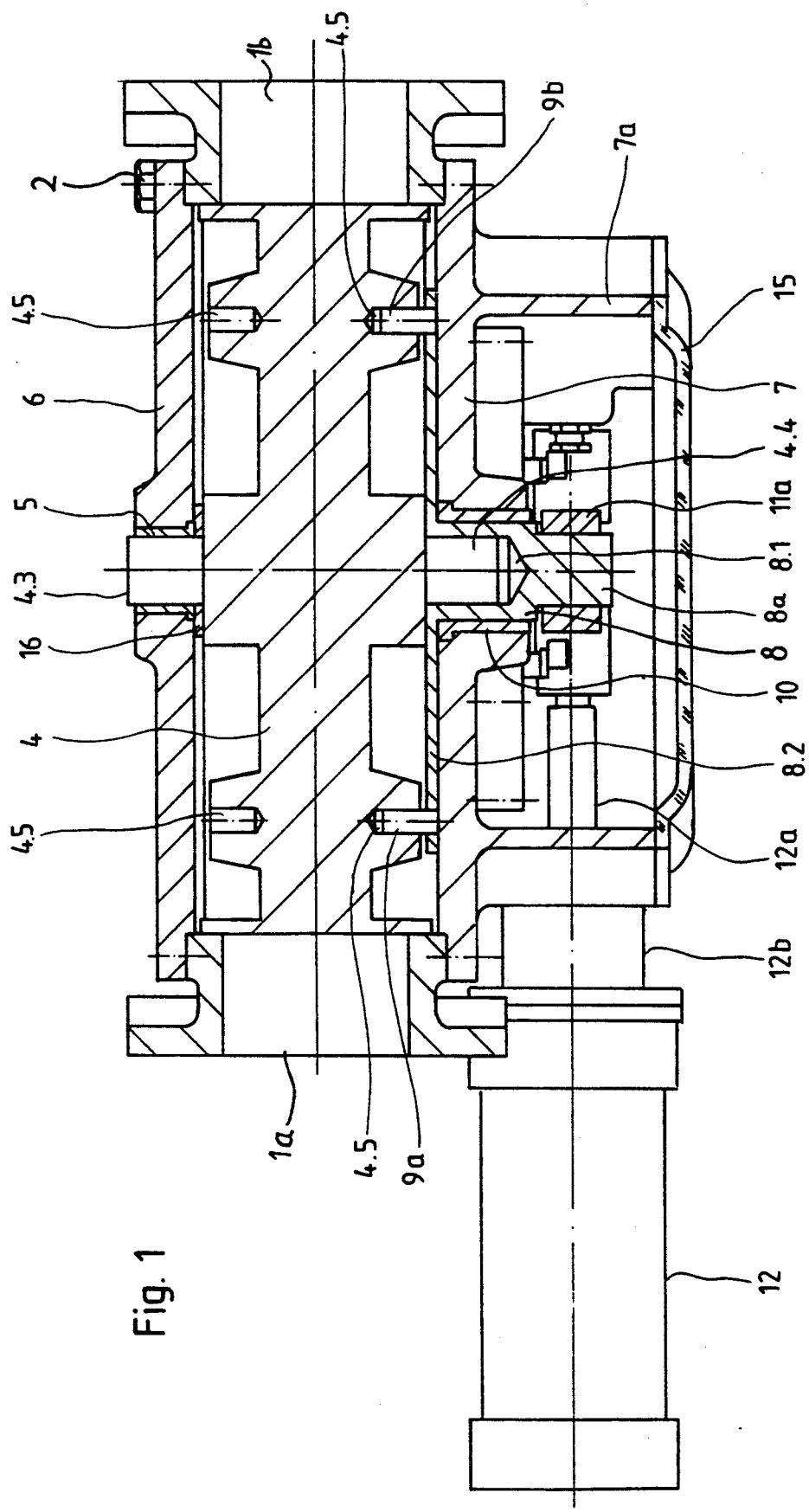
FIG. 1 is a longitudinal section of one embodiment of a pipe switch in accordance with the present invention.

Throughout all the Figures, the same or corresponding elements are always indicated by the same reference numerals.

Referring now to the drawing and in particular to FIG. 1, there is shown a longitudinal section of one embodiment of a pipe switch or multiport valve in accordance with the present invention, including a generally circular housing 1 of approximate Y-shape which defines three circumferential ports 1a, 1b and 1c. The first port 1a and the second port 1b extend along a common center axis which is offset to the geometric center of the housing 1. Accommodated within the interior of the housing 1 is a regulating means in form of a rotor or cock 4 which is preferably made of cast aluminum and extends between opposing lateral side covers 6, 7 threadably engaged to the housing 1 (only one screw 2 is shown).

Figure 2:
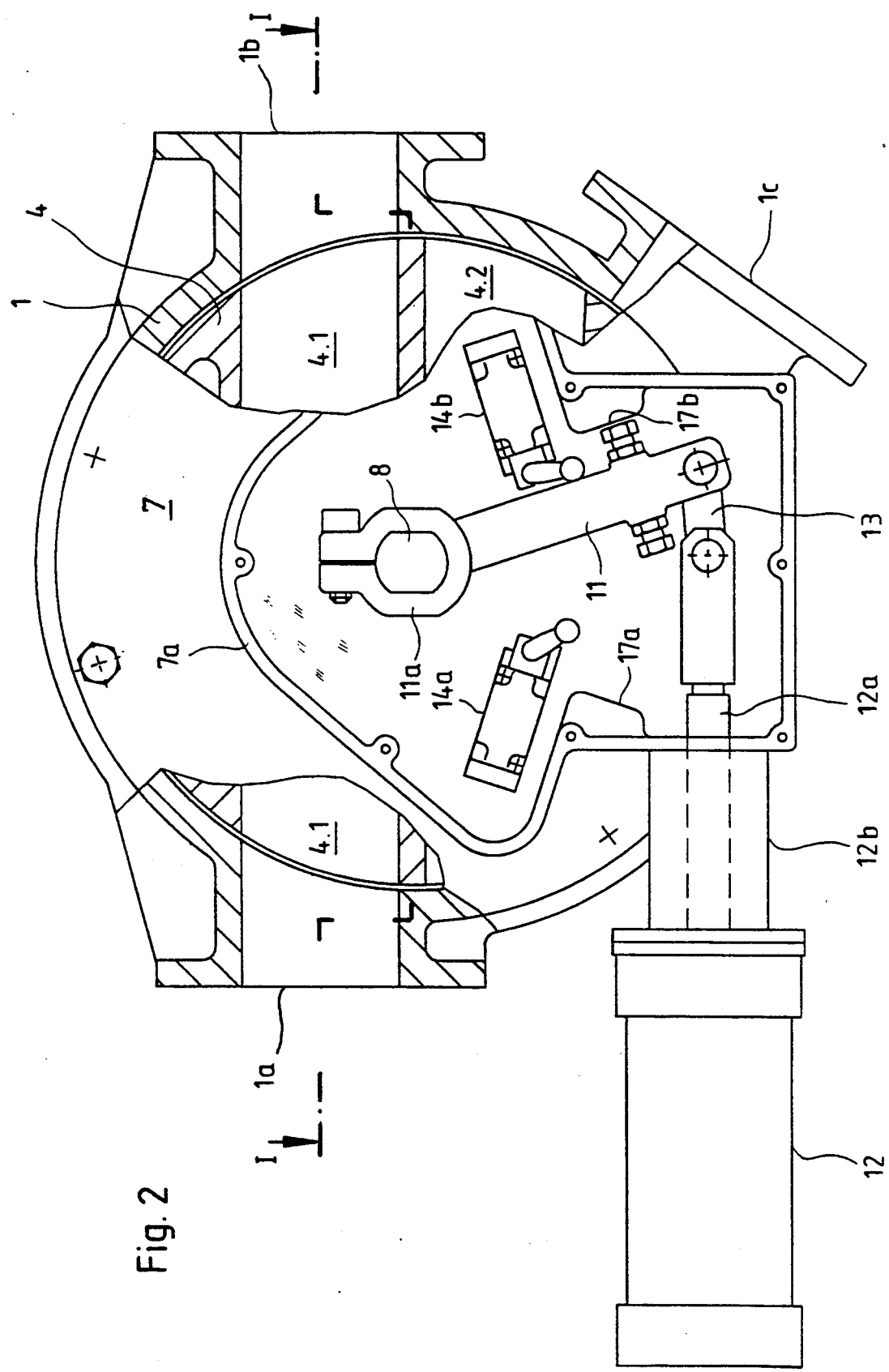
FIG. 2 is a plan view upon the pipe switch with partly broken away side cover, and showing in detail the drive unit, with the cock occupying a first position.

As can be seen in particular in FIG. 2, the cock 4 has a first passageway 4.1 for connecting the first port 1a with the second port 1b, and a second passageway 4.2 for connecting the first port 1a with the third port 1c. At a central location thereof, the cock 4 is provided with two opposing journals 4.3 and 4.4, with the journal 4.3 being supported in the rearward side cover 6 of the housing 1 via an interposed bushing 5, and with the other journal 4.4 being supported in a bore 8.1 of a pivot pin 8. Connected in one piece with the pivot pin 8 is an engaging means in form of a driver plate 8.2 which is sandwiched between the forward side cover 7 and the neighboring facing side of the cock 4. The driver plate 8.2 is provided with two peripheral pins 9a, 9b which engage complementary bores 4.5 in the cock 4 to create a force-locking fit of the driver plate 8.2 and the cock 4. Persons skilled in the art will understand that provision of at least one peripheral pin is sufficient.

The pivot pin 8 is rotatably supported by the forward side cover 7 via a bushing 10. As shown in FIG. 1, the pivot pin 8 is extended beyond the side cover 7 by a projecting part 8a of reduced diameter which serves as drive journal of the cock 4. The projecting part 8a projects into an external compartment which is formed by a continuous outer wall 7a and closed toward the outside by a lid 15. Since the side cover 7 is usually a casting material, it is preferred to make the outer wall 7a in one piece with the side cover 7.

Figure 3:
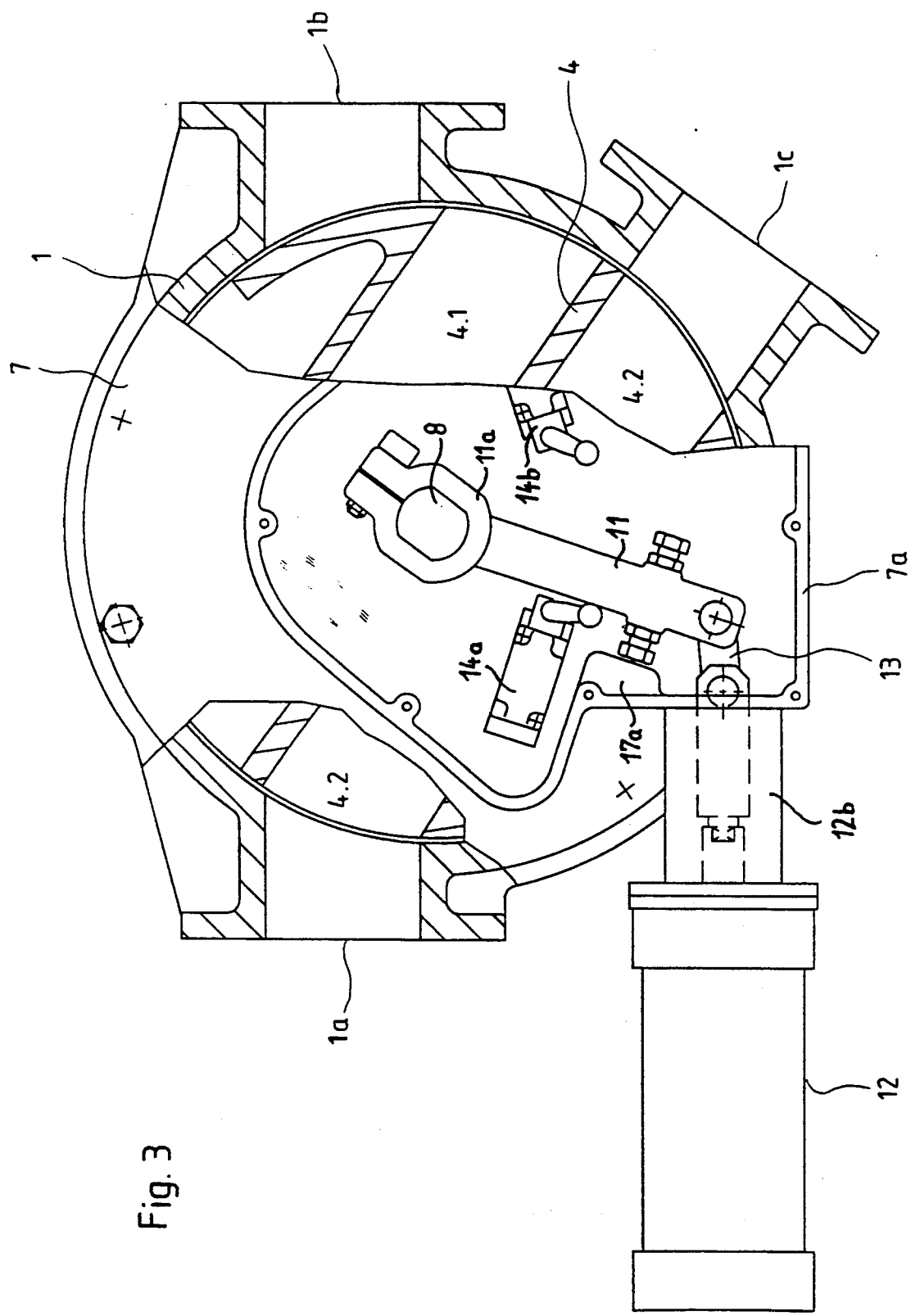
FIG. 3 is a plan view upon the pipe switch similar to FIG. 2, with the cock occupying a second position.

As shown in FIG. 2, which is a plan view upon the pipe switch with partly broken away side cover 7 and showing in detail the drive unit, the projecting part 8a is enclosed by a clamping chuck 11a which forms one end of a lever 11. The other end of the lever 11 is rotatably connected to a link element 13 which in turn is pivoted to one end of a piston rod 12a. The piston rod 12a traverses the outer wall 7a, with its other end projecting in a double-acting working cylinder 12 which is mounted to the exterior of the outer wall 7a via a tubular adapter 12b. By means of the cylinder/piston arrangement, the lever 11 is moved back and forth between two end positions which are suitably defined by stop members 17a, 17b, respectively projecting from the outer wall 7a into the compartment. Conventional limit switches 14a and 14b are suitably positioned near the stop members 17a, 17b to alert an operator when the lever 11 reaches the end positions and to determine as to whether the cock 4 is in proper position. The end positions of the cock 4 are depicted in FIGS. 2 and 3, with FIG. 2 illustrating one end position of the cock 4 for connecting port 1a with port 1b, and with FIG. 3 illustrating the other end position of the cock 4 for connecting port 1a with port 1c.

In accordance with the present invention, essentially all movable parts of the drive unit, i.e. drive journal 8a, lever 11, and the lever-near end section of the piston rod 12a, together with the limit switches 14a, 14b are housed within the external compartment and thus shielded from any possibility of contact and contamination. Another essential feature is the attachment of the working cylinder 12 either directly or indirectly to the side cover 7 whereby the position of the working cylinder 12 relative to the orientation of the ports 1a and 1b may differ from the illustration of FIG. 1, e.g. by angularly shifting the screwed connection of the side cover 7 to the housing 1.

Persons skilled in the art will understand that even though the drawing illustrates the drive unit as being connected to the forward side cover, this is done by way of example only. It is certainly possible to change the position of the drive unit by simply exchanging the side covers 6 and 7 including the pertaining elements, i.e. the drive unit is then connected to the rearward side cover. In order to maintain a correct alignment of the passageways 4.1 and 4.2 of the cock 4 with the ports 1a, 1b and 1c of the housing 1 also during exchange of the side covers 6, 7, it is preferred to provide a spacer disk 16 between the side cover 6 and the facing surface of the cock 4. In the nonlimiting example of FIG. 1, in which the drive unit is mounted to the forward side cover, the spacer disk 16 surrounds the journal 4.3 in the opposing side cover, with the spacer disk 16 having a width essentially corresponding to the width of the driver plate 8.2. Suitably, in order to allow each side face of the cock 4 to be securely connectable with the driver plate 8.2, the opposing side faces of the cock are of similar design i.e. also the rear side face of the cock 4 is provided with peripheral bores 4.5 to allow engagement of the pins 9a, 9b when exchanging the side covers.

While the invention has been illustrated and described as embodied in a pipe switch with externally arranged drive unit, it is not intended to be limited to the details shown since various modifications and structural changes may be made without departing in any way from the spirit of the present invention.

What is claimed as new and desired to be protected by Letters Patent is set forth in the appended claims:

1. A pipe switch for pneumatically conveying a material such as bulk material, comprising:
   a housing having opposing side covers and defining a first port, a second port and a third port;
   an outer wall mounted to said housing at one of said side covers for defining an external compartment, with said outer wall being made in one piece with said one side cover;
   regulating means accommodated in said housing and movable between two positions for selectively controlling the flow of material from said first port to said second port via a first passageway and from said first port of said third port via a second passageway;
   engaging means fixedly secured to said regulating means and projecting beyond said one side cover into said compartment; and
   a drive unit operatively connected to said engaging means for actuating said regulating means, said drive unit including a lever having one end fixedly secured to said engaging means and another end, a working cylinder connected to said one side cover and a piston rod reciprocating in said working cylinder and having one end articulated to said other end of said lever so as to move said lever and said regulating means between said two positions, with said one end of said piston rod and said lever being housed within said compartment.

2. A pipe switch as defined in claim 1, and further comprising a lid detachably secured to said wall for closing said compartment.

3. A pipe switch as defined in claim 1 wherein said second port and said first port extend coaxial to each other to define a common axis, said third port defining an axis extending at an angle of less than 90° relative to said common axis of said first and second ports.

4. A pipe switch as defining in claim 1 wherein said working cylinder is securely mounted to said outer wall of said compartment.

5. A pipe switch as defined in claim 1, and further comprising stop members provided in said compartment for defining said two positions of said lever.

6. A pipe switch as defined in claim 5, and further comprising limit switches provided in said compartment for indicating when said lever occupies each of said positions.

7. A pipe switch as defined in claim 1 wherein said regulating means is a cock having a journal, said engaging means including a pivot pin receiving said journal and a driver plate connected in one piece with said pivot pin and sandwiched between said one side cover and a facing side of said cock, said driver plate including at least one pin engaging a complementary bore in said cock for attaining a force-locking connection of said driver plate and said cock.

8. A pipe switch as defined in claim 7, and further comprising a spacer disk sandwiched between said other one of said side covers and a facing side of said cock, said spacer disk having a same width as said driver plate.

9. A pipe switch as defined in claim 8 wherein said cock is designed such as to allow a force-locking connection of either of its side faces with said driver plate.

10. A pipe switch for pneumatically conveying a material such as bulk material, comprising:

a housing having opposing side covers and defining a first port, a second port and a third port;

an outer wall mounted to said housing at one of said side covers for defining an external compartment, with said outer wall being made in one piece with said one side cover;

regulating means accommodated in said housing and movable between two positions for selectively controlling the flow of material from said first port to said second port via a first passageway and from said first port to said third port via a second passageway;

engaging means fixedly secured to said regulating means and having a projecting part projecting beyond said one side cover into said compartment; and a drive unit operatively connected to the projecting part of said engaging means for actuating said regulating means, said drive unit being securely mounted to said one side cover such that movable parts of said engaging means and said drive unit are housed within said compartment and shielded from outside.

11. A pipe switch for pneumatically conveying a material such as bulk material, comprising:

a housing having opposing side covers and defining a first port, a second port and a third port;

an outer wall mounted to said housing at one of said side covers for defining an external compartment;

regulating means including a cock with a journal and accommodated in said housing and movable between two positions for selectively controlling the flow of material from said first port to said second port via a first passageway and from said first port to said third port via a second passageway;

engaging means fixedly secured to said regulating means and projecting beyond said one side cover into said compartment, said engaging means including a pivot pin receiving said journal and a driver plate connected in one piece with said pivot pin and sandwiched between said one side cover and a facing side of said cock, said driver plate including at least one pin engaging a complementary bore in said cock for attaining a force-locking connection of said driver plate and said cock; and a drive unit operatively connected to said engaging means for actuating said regulating means, said drive unit including a lever having one end fixedly secured to said engaging means and another end, a working cylinder connected to said one side cover and a piston rod reciprocating in said working cylinder and having one end articulated to said other end of said lever so as to move said lever and said regulating means being said two positions, with said one end of said piston rod and said lever being housed within said compartment.

* * * * *